(No Model.)

J. B. WILSON & J. F. KORTEPETER.
DEVICE FOR HOLDING ANIMALS.

No. 259,349. Patented June 13, 1882.

WITNESSES:
C. Hood.
Wm H Daggett

INVENTORS
John B. Wilson,
John F. Kortepeter.
By H. P. Hood, Atty.

UNITED STATES PATENT OFFICE.

JOHN B. WILSON AND JOHN F. KORTEPETER, OF SOUTHPORT, INDIANA.

DEVICE FOR HOLDING ANIMALS.

SPECIFICATION forming part of Letters Patent No. 259,349, dated June 13, 1882.

Application filed January 30, 1882. (No model.)

*To all whom it may concern:*

Be it known that we, JOHN B. WILSON and JOHN F. KORTEPETER, residents of Southport, in the county of Marion and State of Indiana, have invented a new and useful Device for Holding Animals, of which the following is a specification, having reference to the accompanying drawings.

Our invention relates to an improved pen or stall for the purpose of containing and conveniently holding hogs, cattle, or horses during surgical operation thereon.

It consists, first, in a pen or stall open at the rear, but inclosing the animal on all sides so closely that it cannot turn about therein, and provided with a lever for catching and holding the animal's neck, and a door for the exit of the animal at one end, as hereinafter fully described.

It consists, further, in a peculiar construction whereby the above-mentioned device is made adjustable to different-sized animals, which construction is hereinafter fully described.

Figure 1:
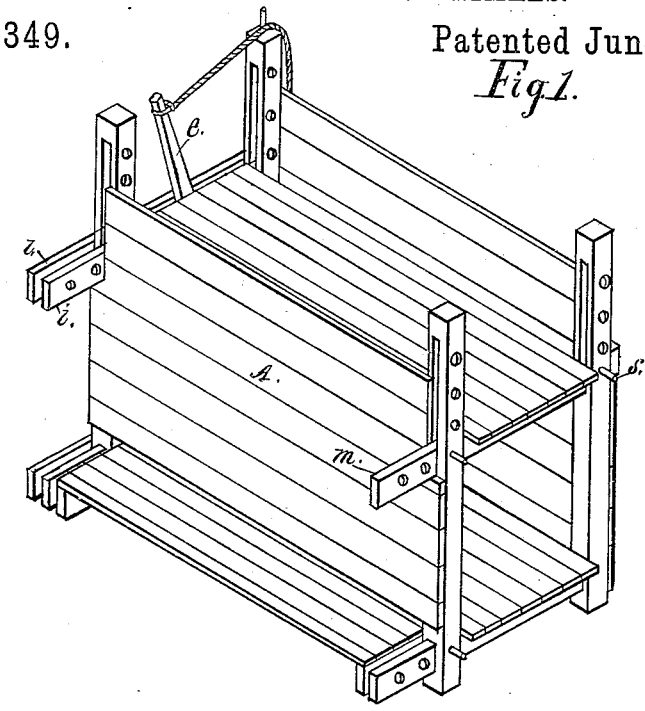
Figure 2:
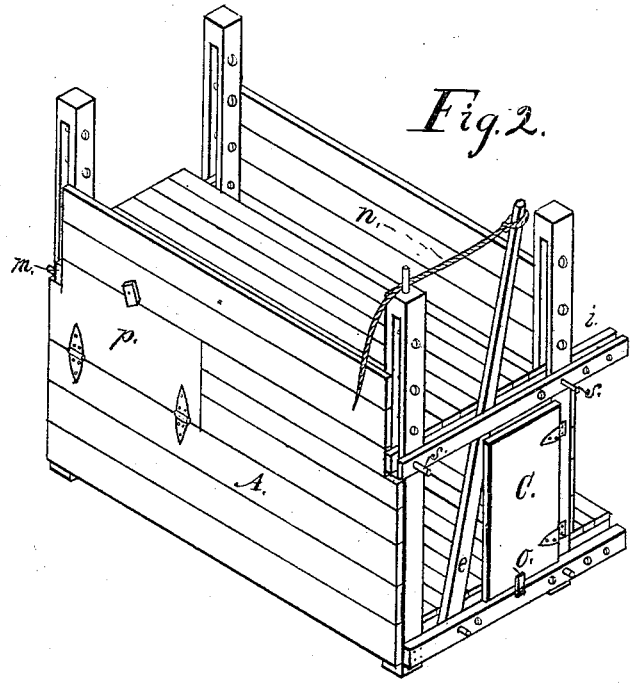

The accompanying drawings illustrate our invention, in which Figure 2 is a perspective view of the front end, one side, and top of our device. Fig. 1 is a similar view of the rear end and other side.

A is a stall or pen, about five or six feet long, having a floor, the top and sides being closed. The front end is provided with a door, C, and a lever, e. Said lever is pivoted at the lower end to the bottom rail of the pen, leaving a narrow space between the edge of the lever and the corner-post. The upper end of lever e moves freely between the front top rails, i i, and is moved toward and secured to the corner-post by a chain or cord, n. The door C is hinged to the opposite corner-post, as shown, and is secured by bolt o. The sides of the pen are to be a suitable distance apart to allow the animal to freely enter, but not wide enough to allow him to turn about between them, and the top should be close enough to his back to prevent the rising of his hind quarters to kick.

A low gate may be added to the rear end, if desired; but it is not essential to the operation of our device.

For the purpose of enabling the operator to easily reach the animal from one side in castrating cattle or horses, we provide an opening, closed by the side door, p.

In order to make a single pen suitable for different-sized animals, we make the width and height adjustable. The corner-posts are made high enough to admit a horse, and mortises are made extending from near the top downward. The cross-rails m and i, supporting the roof, are passed through said mortises, and are held in place by pins s passing through any one of a series of holes in the post and through the rail, as shown. Rails m and i, and also the bottom rails, are provided at one end with a series of holes, so that the sides may be moved farther apart or nearer together, as circumstances require.

The operation of our device is as follows: The rear end of the pen being open, the animal is driven into it, and, being urged forward, naturally projects his head through the aperture at the front end between the lever e and corner-post. The top of lever e is now drawn toward the corner-post by the rope or chain n, catching the animal by the neck and holding him securely while the operation of ringing or castrating is performed. After the operation is performed the lever e is released, and, the door C being opened, the animal is driven out.

We claim as our invention—

1. In combination with pen A, lever e, door C, and door p, all arranged as shown and described, for the purpose set forth.

2. A pen for holding animals during the operation of castration or ringing, having laterally-adjustable sides and a vertically-adjustable top, substantially as described, and combined with a holding-lever, e, and exit-door C, substantially in the manner and for the purpose set forth.

In testimony whereof we have hereunto signed our names.

JOHN B. WILSON.
JOHN F. KORTEPETER.

Witnesses:
H. P. HOOD,
OZNI P. HOOD.